United States Patent
Kwon et al.

(10) Patent No.: US 9,299,988 B2
(45) Date of Patent: Mar. 29, 2016

(54) ELECTRODE SHEET INCLUDING NOTCHING PORTION

(71) Applicant: LG Chem, Ltd., Seoul (KR)

(72) Inventors: Sungjin Kwon, Daejeon (KR); Dong-Myung Kim, Daejeon (KR); Ki Woong Kim, Daejeon (KR); Soonho Ahn, Seoul (KR)

(73) Assignee: LG Chem, Ltd. (KR)

( * ) Notice: Subject to any disclaimer, the term of this patent is extended or adjusted under 35 U.S.C. 154(b) by 42 days.

(21) Appl. No.: 13/845,670

(22) Filed: Mar. 18, 2013

(65) Prior Publication Data

US 2014/0141326 A1    May 22, 2014

Related U.S. Application Data

(63) Continuation of application No. PCT/KR2013/002132, filed on Mar. 15, 2013.

(60) Provisional application No. 61/728,970, filed on Nov. 21, 2012.

(30) Foreign Application Priority Data

Dec. 27, 2012  (KR) .................. 10-2012-0155220

(51) Int. Cl.
*H01M 4/70*     (2006.01)
*H01M 10/04*    (2006.01)
*H01M 4/02*     (2006.01)

(52) U.S. Cl.
CPC ............ *H01M 4/70* (2013.01); *H01M 10/04* (2013.01); *H01M 2004/021* (2013.01); *Y10T 428/24777* (2015.01)

(58) Field of Classification Search
None
See application file for complete search history.

(56) References Cited

U.S. PATENT DOCUMENTS

| 3,442,717 A | 5/1969 | Horn et al. |
| 4,092,464 A | 5/1978 | Dey et al. |

(Continued)

FOREIGN PATENT DOCUMENTS

| CN | 1314008 A | 9/2001 |
| CN | 1799162 A | 7/2006 |

(Continued)

OTHER PUBLICATIONS

Inernational Search Report for Application No. PCT/KR2013/001815 dated Jun. 27, 2013.

(Continued)

*Primary Examiner* — Barbara Gilliam
*Assistant Examiner* — Adam A Arciero
(74) *Attorney, Agent, or Firm* — Lerner, David, Littenberg, Krumholz & Mentlik, LLP

(57) ABSTRACT

Disclosed herein is an electrode sheet having an electrode active material applied to one major surface or opposite major surfaces of a current collector sheet, the electrode sheet being cut to manufacture a plurality of unit electrode plates, wherein first notch portions are formed at one side, selected from between an upper side and a lower side, of the electrode sheet such that the first notch portions are arranged at intervals corresponding to a width of each of the unit electrode plates and second notch portions corresponding to the first notch portions are formed at the other side of the electrode sheet, and wherein an upper end cut side for a cutting margin is formed at each of the second notch portions, the upper end cut side being smaller in size than a lower end cut side.

20 Claims, 4 Drawing Sheets

(56) References Cited

U.S. PATENT DOCUMENTS

| | | |
|---|---|---|
| 4,964,877 A | 10/1990 | Keister et al. |
| 5,633,097 A | 5/1997 | Miller |
| 5,652,074 A | 7/1997 | Larson, III et al. |
| 6,224,995 B1 | 5/2001 | Fauteux et al. |
| 6,300,002 B1 | 10/2001 | Webb et al. |
| 6,498,951 B1 | 12/2002 | Larson et al. |
| 6,610,443 B2 | 8/2003 | Paulot et al. |
| 6,946,220 B2 | 9/2005 | Probst et al. |
| 7,285,334 B1 | 10/2007 | Yamashita et al. |
| 7,479,349 B2 | 1/2009 | O'Phelan et al. |
| 7,595,132 B2 | 9/2009 | Kang et al. |
| 2001/0005561 A1 | 6/2001 | Yamada et al. |
| 2002/0160257 A1 | 10/2002 | Lee et al. |
| 2003/0077509 A1 | 4/2003 | Probst et al. |
| 2005/0164094 A1 | 7/2005 | Kotato et al. |
| 2005/0214642 A1* | 9/2005 | Kim et al. ............... 429/211 |
| 2006/0269842 A1 | 11/2006 | Ichinose et al. |
| 2006/0275661 A1 | 12/2006 | Kim et al. |
| 2006/0286456 A1 | 12/2006 | Fu et al. |
| 2007/0054180 A1 | 3/2007 | Miyajima et al. |
| 2007/0059595 A1 | 3/2007 | Endo et al. |
| 2007/0287064 A1 | 12/2007 | Suzuki et al. |
| 2008/0137890 A1 | 6/2008 | Petersen et al. |
| 2009/0075168 A1 | 3/2009 | Lee |
| 2009/0159582 A1 | 6/2009 | Chami et al. |
| 2010/0112451 A1 | 5/2010 | Shibutani et al. |
| 2011/0183183 A1 | 7/2011 | Grady et al. |
| 2011/0274955 A1 | 11/2011 | Park et al. |
| 2011/0287308 A1 | 11/2011 | Kim et al. |
| 2012/0015223 A1 | 1/2012 | Bhardwaj et al. |
| 2012/0015236 A1 | 1/2012 | Spare |
| 2012/0135299 A1 | 5/2012 | Kwon et al. |
| 2012/0156551 A1 | 6/2012 | Cho |
| 2012/0225345 A1 | 9/2012 | Kim |
| 2013/0144167 A1 | 6/2013 | Lee et al. |
| 2014/0093762 A1 | 4/2014 | Goh et al. |

FOREIGN PATENT DOCUMENTS

| | | |
|---|---|---|
| CN | 101107736 A | 1/2008 |
| EP | 1309018 A2 | 5/2003 |
| EP | 1326680 A1 | 7/2003 |
| JP | 02-056856 | 2/1990 |
| JP | 05-234598 | 9/1993 |
| JP | 08-171930 | 7/1996 |
| JP | 09-063591 | 3/1997 |
| JP | 09-082361 | 3/1997 |
| JP | 09260209 | 10/1997 |
| JP | 10-270014 | 10/1998 |
| JP | H10296879 A | 11/1998 |
| JP | 2000133317 A | 5/2000 |
| JP | 2001028275 A | 1/2001 |
| JP | 2001167743 A | 6/2001 |
| JP | 2002199910 A | 7/2002 |
| JP | 2002-343350 A | 11/2002 |
| JP | 2003217601 A | 7/2003 |
| JP | 2003234094 A | 8/2003 |
| JP | 2004111219 A | 4/2004 |
| JP | 3611765 B2 | 1/2005 |
| JP | 2005169728 A | 6/2005 |
| JP | 3680797 B2 | 8/2005 |
| JP | 2006127882 A | 5/2006 |
| JP | 2006134604 A | 5/2006 |
| JP | 2006-278331 A | 10/2006 |
| JP | 2009-218105 A | 9/2009 |
| KR | 20-0207948 | 1/2001 |
| KR | 1020010055968 A | 7/2001 |
| KR | 20010104150 | 11/2001 |
| KR | 1020030066960 A | 8/2003 |
| KR | 20050020357 A | 3/2005 |
| KR | 20050036466 A | 4/2005 |
| KR | 100670492 B1 | 1/2007 |
| KR | 20070066401 A | 6/2007 |
| KR | 1020070075941 A | 7/2007 |
| KR | 1020070099068 A | 10/2007 |
| KR | 100829553 B1 | 5/2008 |
| KR | 20080058772 A | 6/2008 |
| KR | 20080095967 A | 10/2008 |
| KR | 10-0866767 B1 | 11/2008 |
| KR | 20090003823 A | 1/2009 |
| KR | 20090028243 A | 3/2009 |
| KR | 20090062409 A | 6/2009 |
| KR | 20090097731 A | 9/2009 |
| KR | 20100137290 A | 12/2010 |
| KR | 20110105737 A | 9/2011 |
| KR | 20110112241 A | 10/2011 |
| KR | 20110128594 A | 11/2011 |
| KR | 20120060706 A | 6/2012 |
| WO | 0072392 A1 | 11/2000 |
| WO | 2012-009423 A1 | 1/2012 |
| WO | 2012053772 A2 | 4/2012 |
| WO | 2013-180378 A1 | 12/2013 |

OTHER PUBLICATIONS

International Search Report for Application No. PCT/KR2013/002118 dated Jun. 28, 2013.
International Search Report for Application No. PCT/KR2013/002127 dated Jun. 27, 2013.
Chinese Office Action for Application No. 201380002792.X dated Apr. 3, 2015.
Machine translation of KR 2003-0066960 (Jang).

* cited by examiner

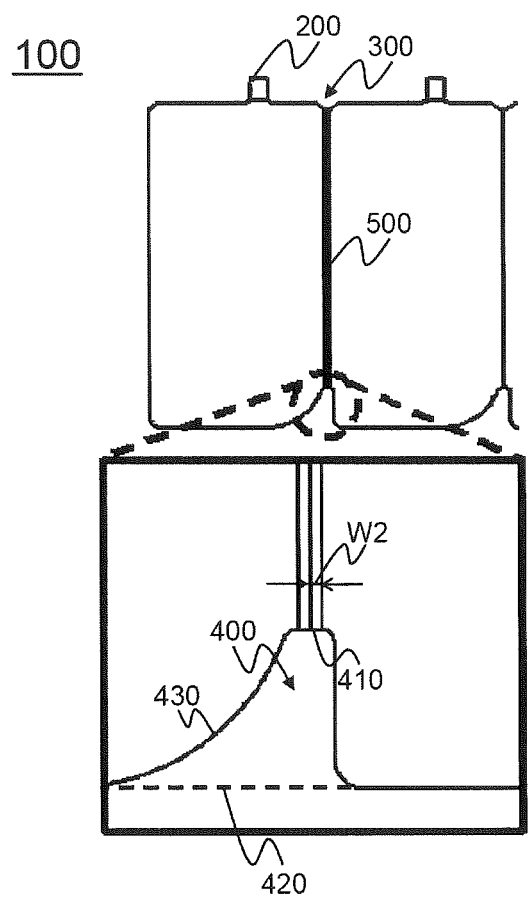

ELECTRODE SHEET INCLUDING NOTCHING PORTION

CROSS REFERENCE TO RELATED APPLICATIONS

The present application is a continuation of International Application No. PCT/KR2013/002132 filed Mar. 15, 2013, which claims the benefit of the filing date of Korean Patent Application No. 10-2012-015520 filed Dec. 27, 2012 and U.S. Provisional Patent Application No. 61/728,970 filed on Nov. 21, 2012, the disclosures of which are hereby incorporated herein by reference.

TECHNICAL FIELD

The present invention relates to an electrode sheet including notch portions and, more particularly, to an electrode sheet having an electrode active material applied to one major surface or opposite major surfaces of a current collector sheet, the electrode sheet being cut to manufacture a plurality of unit electrode plates, wherein first notch portions are formed at one side, selected from between an upper side and a lower side, of the electrode sheet such that the first notch portions are arranged at intervals corresponding to a width of each of the unit electrode plates and second notch portions corresponding to the first notch portions are formed at the other side of the electrode sheet, and wherein an upper end cut side for a cutting margin is formed at each of the second notch portions, the upper end cut side being smaller in size than a lower end cut side.

BACKGROUND ART

Recently, secondary batteries, which can be charged and discharged, have been widely used as an energy source or an auxiliary power unit for wireless mobile devices. In addition, secondary batteries have also attracted considerable attention as a power source for electric vehicles (EV), hybrid electric vehicles (HEV), and plug-in hybrid electric vehicles (Plug-in REV), which have been developed to solve problems, such as air pollution, caused by existing gasoline and diesel vehicles using fossil fuels.

Secondary batteries are generally formed in the shape of a rectangular parallelepiped. According to the diversity in design of devices using such secondary batteries, however, there is an increasing necessity for secondary batteries having various shapes.

For a smartphone, which is an example of devices requiring secondary batteries having various shapes, sides or corners of the smartphone may be curved to improve grip. In a case in which the secondary batteries formed in the shape of the rectangular parallelepiped are mounted in a device designed so as to have such curved portions, however, utilization of the inner space of the device may be limited.

That is, the curved portions of the device have dead spaces, in which the secondary batteries formed in the shape of the rectangular parallelepiped cannot be mounted. Ultimately, such dead spaces lower the capacity of the device per unit volume.

A secondary battery is generally manufactured to have a structure in which an electrode assembly is contained in a battery case together with an electrolyte. Based on methods of manufacturing the electrode assembly, the electrode assembly may be classified as a stacked type electrode assembly, a folded type electrode assembly, or a stacked and folded type electrode assembly.

In the stacked type electrode assembly or the stacked and folded type electrode assembly, cathodes and anodes are sequentially stacked in a state in which separators are disposed respectively between the cathodes and the anodes. In order to manufacture the electrode assembly, it is necessary to manufacture the cathodes and the anodes first.

In order to manufacture unit electrode plates, such as anodes and cathodes, it is necessary to notch a long electrode sheet having an electrode active material applied to one major surface or opposite major surfaces thereof at intervals corresponding to the width of each of the unit electrode plates. In the notching process, a press is generally used to notch portions of the electrode sheet. After the electrode sheet is notched, the electrode sheet is cut at intervals corresponding to the width of each of the unit electrode plates.

The above process will be described with reference to FIG. 1A. In the notching process, electrode tabs 20 and first notch portions 30 are formed at the upper side of an electrode sheet 10 such that the first notch portions 30 are arranged at intervals corresponding to the width of a unit electrode plate. Second notch portions 40 are formed at the lower side of the electrode sheet 10 such that the second notch portions 40 are arranged at the intervals corresponding to the width of the unit electrode plate. A left side 41 of each of the second notch portions 40 is formed in an arc shape, by which one corner of the unit electrode plate is rounded.

In the cutting process, the electrode sheet 10 is cut along a virtual cutting line 50 interconnecting each of the first notch portions 30 and each of the second notch portions 40 at the intervals corresponding to the width of the unit electrode plate. However, the electrode sheet 10 is frequently cut at a position deviating from the cutting line 50 to the left or the right by a predetermined width W1 due to a cutting tolerance.

FIG. 1B is a typical view showing a unit electrode plate 60 cut with the cutting tolerance. Referring to FIG. 1B, a protrusion 70 is formed at the lower end of a right side of the unit electrode plate 60. A contour line interconnecting angular points of the unit electrode plate may take a quadrangular shape due to the protrusion 70, which does not conform with a design purpose to manufacture an electrode plate having a round corner. As a result, it may be not possible to manufacture an electrode plate having a round corner. Consequently, there is a high necessity to develop an electrode sheet having novel notch portions to solve the above problems.

DISCLOSURE

Technical Problem

Therefore, the present invention has been made to solve the above problems, and other technical problems that have yet to be resolved.

Specifically, it is an object of the present invention to provide a unit electrode plate that is capable of conforming with an initial design shape even when a cutting tolerance is generated.

It is another object of the present invention to provide a secondary battery manufactured using such a unit electrode plate.

Technical Solution

In accordance with one aspect of the present invention, the above and other objects can be accomplished by the provision of an electrode sheet having an electrode active material applied to one major surface or opposite major surfaces of a current collector sheet, the electrode sheet being cut to manufacture a plurality of unit electrode plates, wherein first notch portions are formed at one side, selected from between an upper side and a lower side, of the electrode sheet such that the first notch portions are arranged at intervals corresponding to a width of each of the unit electrode plates and second notch portions corresponding to the first notch portions are formed at the other side of the electrode sheet, and wherein an upper end cut side for a cutting margin is formed at each of the second notch portions, the upper end cut side being smaller in size than a lower end cut side.

That is, in the electrode sheet including the notch portions according to the present invention, the upper end cut side is formed at each of the second notch portions unlike conventional notch portions. Even when a cutting tolerance is generated, therefore, it is possible to manufacture a unit electrode plate conforming with an initial design shape and having no protrusion by cutting the electrode sheet along the cutting line on the upper end cut side.

In an embodiment of the present invention, each of the first notch portions may be configured to have a wedge-shaped structure having a width decreased toward a central axis of the electrode sheet. The central axis of the electrode sheet is a central axis on which centers of the respective unit electrode plates are connected in the longitudinal direction of the electrode sheet. The central axis direction of the electrode sheet may be a direction directed from the upper side to the central axis of the electrode sheet.

Each of the second notch portions may have a larger area than each of the first notch portions. Each of the second notch portions may be larger than each of the first notch portions such that various structures may be formed at one corner of each of the unit electrode plates.

The lower end cut side of each of the second notch portions may have a length equivalent to 10 to 80% the width of each of the unit electrode plates. The width of each of the unit electrode plates may be the length of one side of each of the unit electrode plates in a direction perpendicular to the direction in which the electrode sheet is cut. In addition, the length of the lower end cut side of each of the second notch portions may be adjusted based on a desired shape of each of the unit electrode plates.

The upper end cut side of each of the second notch portions may have a length of 0.1 to 1 mm. If the length of the upper end cut side of each of the second notch portions is too small, the electrode sheet is not cut on the upper end cut side of each of the second notch portions when a cutting tolerance is generated with the result that a protrusion may be formed at each of the unit electrode plates. If the length of the upper end cut side of each of the second notch portions is too large, on the other hand, a ratio in size of the upper end cut side to each of the unit electrode plates is increased with the result that it may be necessary to further cut the upper end cut side of each of the second notch portions in order to manufacture a battery cell having a desired shape.

Specifically, when the upper end cut side of each of the second notch portions has a length of 0.2 to 0.8 mm, it is possible to prevent generation of a protrusion due to a cutting tolerance and thus to manufacture a battery cell having a desired shape without further cutting of the upper end cut side of each of the second notch portions.

In addition, the distance between the upper end cut side and the lower end cut side of each of the second notch portions may be equivalent to 30 to 150% a length of lower end cut side. The distance between the upper end cut side and the lower end cut side of each of the second notch portions may be adjusted based on a desired shape of each of the unit electrode plates.

Opposite lateral cut sides of each of the second notch portions may be symmetrical. Alternatively, the opposite lateral cut sides of each of the second notch portions may be asymmetrical.

In a case in which the opposite lateral cut sides of each of the second notch portions are symmetrical, one corner and the other corner of each of the unit electrode plates manufactured from the electrode sheet may also be symmetrical.

In a case in which the opposite lateral cut sides of each of the second notch portions are asymmetrical, on the other hand, one corner and the other corner of each of the unit electrode plates manufactured from the electrode sheet may also be asymmetrical.

At least one lateral cut side of each of the second notch portions may be formed in an arc shape protruding toward each of the second notch portions. As a result, one corner of each of the unit electrode plates may be rounded.

In accordance with another aspect of the present invention, there is provided an electrode plate formed by cutting the electrode sheet with the above-stated construction. At least one lateral cut side tangent to an upper side of the electrode plate may be provided with an upper end cut side of a second notch portion based on a cutting margin. According to circumstances, a portion of the upper end cut side of the second notch portion based on the cutting margin may not be provided at opposite lateral cut sides of the electrode plate.

In accordance with another aspect of the present invention, there is provided a method of manufacturing the electrode plate with the above-stated construction, the method including (a) conveying an electrode sheet to a die and fixing the electrode sheet on the die, (b) stamping the electrode sheet to form a first notch portion and a second notch portion, and (c) cutting the electrode sheet at intervals corresponding to a width of a unit electrode plate.

At step (a), the electrode sheet may be conveyed while being held by a gripper and then fixed on the die such that the electrode sheet is disposed in position.

At step (b), the electrode sheet may be stamped using a press machine to press the electrode sheet into a specific shape to form the first notch portion and the second notch portion at the electrode sheet.

At step (c), the electrode sheet may be cut along a virtual cutting line interconnecting the first notch portion and the second notch portion such that the electrode sheet is cut at intervals corresponding to the width of the unit electrode plate.

In accordance with another aspect of the present invention, there is provided an electrode assembly manufactured by stacking electrode plates with the above-stated construction.

In accordance with another aspect of the present invention, there is provided a secondary battery including the electrode assembly with the above-stated construction contained in a battery case with a non-aqueous electrolyte containing lithium salt in a sealed state.

In accordance with another aspect of the present invention, there is provided a battery pack including one or more secondary batteries with the above-stated construction. In consideration of structural stability of the battery pack, the battery pack may be used in a device, such as a mobile phone, a portable computer, a smartphone, a smart pad, a netbook computer, a light electric vehicle (LEV), an electric vehicle, a hybrid electric vehicle, a plug-in hybrid electric vehicle, or a power storage device, which requires long-term use and excellent durability.

In accordance with a further aspect of the present invention, there is provided a device including the battery pack with the above-stated construction as a power source. Specifically, the device may be a mobile phone, a portable computer, a smartphone, a smart pad, a netbook computer, an LEV, an electric vehicle, a hybrid electric vehicle, a plug-in hybrid electric vehicle, or a power storage device.

The structure of the device and a method of manufacturing the device are well known in the art to which the present invention pertains, and therefore, a detailed description thereof will be omitted.

Effects of the Invention

As is apparent from the above description, the electrode sheet according to the present invention includes second notch portions, at each of which an upper end cut side for a cutting margin, which is smaller than a lower end cut side, is formed. Consequently, it is possible to manufacture a unit electrode plate conforming with an initial design shape even when a cutting tolerance is generated.

DESCRIPTION OF DRAWINGS

The above and other objects, features and other advantages of the present invention will be more clearly understood from the following detailed description taken in conjunction with the accompanying drawings, in which:

FIG. 2 is a typical view showing an electrode sheet according to an embodiment of the present invention.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

Figure 1A:
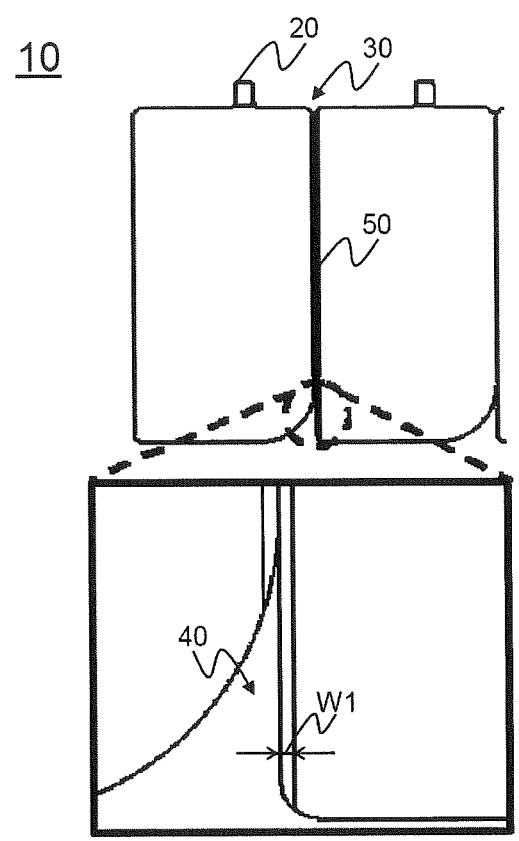
FIG. 1A is a typical view showing a conventional electrode sheet.
Figure 1B:
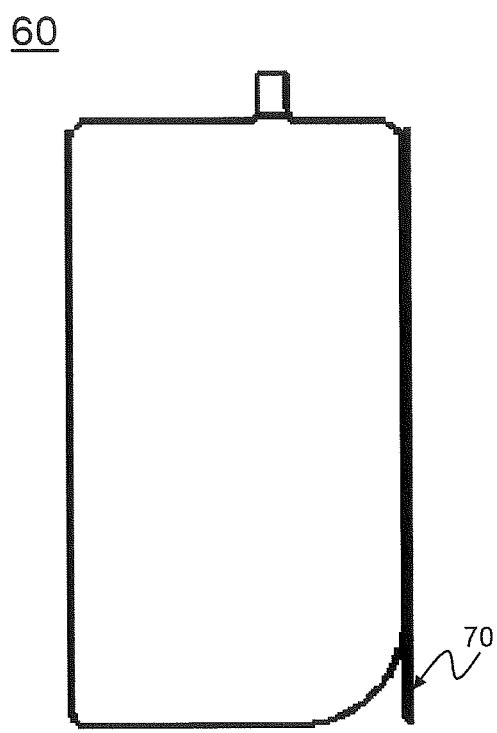
FIG. 1B is a typical view showing a unit electrode plate manufactured from the electrode sheet of FIG. 1A with a cutting tolerance.
Figure 3:
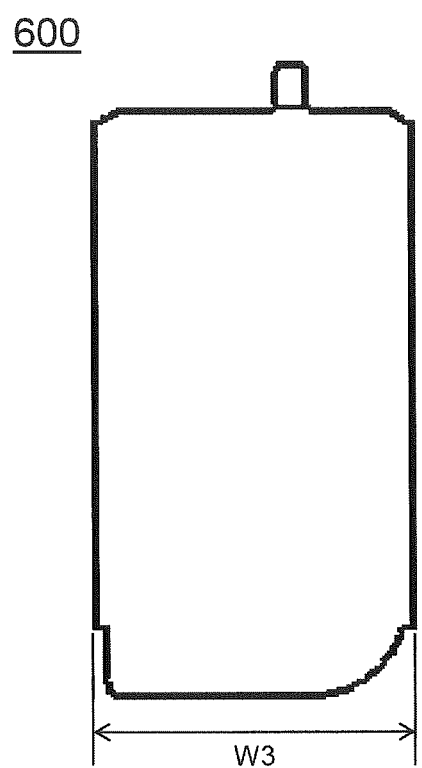
FIG. 3 is a typical view showing a unit electrode plate manufactured from the electrode sheet of FIG. 2 with a cutting tolerance.

FIG. 2 is a typical view showing an electrode sheet according to an embodiment of the present invention and FIG. 3 is a typical view showing a unit electrode plate manufactured from the electrode sheet of FIG. 2 with a cutting tolerance.

Referring to FIGS. 2 and 3, electrode tabs 200 and first notch portions 300 are formed at the upper side of an electrode sheet 100 such that the first notch portions 300 are arranged at intervals corresponding to a width W3 of a unit electrode plate 600. Second notch portions 400 are formed at the lower side of the electrode sheet 100 such that the second notch portions 400 are arranged at the intervals corresponding to the width W3 of the unit electrode plate 600.

An upper end cut side 410 for a cutting margin is formed at each of the second notch portions 400. The upper end cut side 410 is shorter than a lower end cut side 420.

In addition, a left side 430 of each of the second notch portions 400 is formed in an arc shape, by which the right lower end of the unit electrode plate 600 is rounded after the electrode sheet 100 is cut.

In a normal process, the electrode sheet 100 is cut along a cutting line 500 interconnecting the middle point of each of the first notch portions 300 and the middle point of the upper end cut side 410 of each of the second notch portions 400. If a cutting tolerance is generated, however, the electrode sheet 100 is cut at a position deviating from the cutting line 500 by a predetermined width W2.

The unit electrode plate 600 manufactured with the cutting tolerance may be slightly different from a unit electrode plate based on an initially designed standard. However, one corner of the unit electrode plate 600 is rounded, which conforms to a design concept of the electrode plate. Consequently, the unit electrode plate 600 may be used as an element necessary to manufacture an electrode assembly without an additional process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electrode sheet having an electrode active material applied to one major surface or opposite major surfaces of a current collector sheet, the electrode sheet configured for being cut to manufacture a plurality of unit electrode plates,
   wherein first notch portions are formed at an upper side of the electrode sheet such that the first notch portions are arranged at intervals corresponding to a width of each of the unit electrode plates, and second notch portions corresponding to the first notch portions are formed at a lower side of the electrode sheet,
   wherein an upper end cut side and an opposed lower end cut side are formed at each of the second notch portions, the upper end cut side being smaller in size than the lower end cut side, and
   wherein the electrode sheet is configured to be cut along a cutting line that interconnects a middle point of one of the first notch portions and a middle point of the upper end cut side of the corresponding one of the second notch portions and wherein said cutting line separates adjacent unit electrode plates on the electrode sheet.

2. The electrode sheet according to claim 1, wherein each of the first notch portions is configured to have a wedge-shaped structure having a width decreased toward a central axis of the electrode sheet.

3. The electrode sheet according to claim 1, wherein each of the second notch portions has a larger area than each of the first notch portions.

4. The electrode sheet according to claim 1, wherein the lower end cut side of each of the second notch portions has a length equivalent to 10% to 80% the width of each of the unit electrode plates.

5. The electrode sheet according to claim 1, wherein the upper end cut side of each of the second notch portions has a length of 0.1 mm to 1 mm.

6. The electrode sheet according to claim 5, wherein the length of the upper end cut side of each of the second notch portions is 0.2 mm to 0.8 mm.

7. The electrode sheet according to claim 1, wherein a distance between the upper end cut side and the lower end cut side of each of the second notch portions is equivalent to 30% to 150% a length of lower end cut side.

8. The electrode sheet according to claim 1, wherein opposite lateral cut sides of each of the second notch portions are symmetrical.

9. The electrode sheet according to claim 1, wherein opposite lateral cut sides of each of the second notch portions are asymmetrical.

10. The electrode sheet according to claim 1, wherein at least one lateral cut side of each of the second notch portions is formed in an arc shape protruding toward each of the second notch portions.

11. An electrode plate formed by cutting an electrode sheet according to claim 1.

12. The electrode plate according to claim 11, wherein at least one lateral cut side tangent to the upper side of the electrode plate is provided with the upper end cut side of one of the second notch portions based on a cutting margin between adjacent unit electrode plates.

13. A method of manufacturing an electrode plate according to claim 11, the method comprising:
（a) conveying an electrode sheet to a die and fixing the electrode sheet on the die;
(b) stamping the electrode sheet to form a first notch portion and a second notch portion; and
(c) cutting the electrode sheet at intervals corresponding to a width of a unit electrode plate.

14. The method according to claim 13, wherein the electrode sheet between the first notch portion and the second notch portion is cut.

15. An electrode assembly manufactured by stacking electrode plates according to claim 11.

16. A secondary battery comprising an electrode assembly according to claim 15 contained in a battery case with an electrolyte in a sealed state.

17. A battery pack comprising one or more secondary batteries according to claim 16.

18. A device comprising a battery pack according to claim 17.

19. The device according to claim 18, wherein the device is selected from among a mobile phone, a portable computer, a smartphone, a smart pad, a netbook computer, a light electric vehicle (LEV), an electric vehicle, a hybrid electric vehicle, a plug-in hybrid electric vehicle, and a power storage device.

20. An electrode sheet having an electrode active material applied to one major surface or opposite major surfaces of a current collector sheet, the electrode sheet configured for being cut to manufacture a plurality of unit electrode plates,
wherein at least three first notch portions are formed at an upper side of the electrode sheet such that the first notch portions are arranged at intervals corresponding to a width of each of the unit electrode plates, and second notch portions corresponding to the first notch portions are formed at a lower side of the electrode sheet,
wherein an upper end cut side and an opposed lower end cut side are formed at each of the second notch portions, the upper end cut side being smaller in size than the lower end cut side, and
wherein the electrode sheet is configured to be cut along a cutting line that interconnects a middle point of one of the first notch portions and a middle point of the upper end cut side of the corresponding one of the second notch portions and wherein said cutting line separates adjacent unit electrode plates on the electrode sheet.

* * * * *